April 26, 1966 R. A. SCOTT 3,247,876
CENTER POST ASSEMBLY FOR TIRE CHANGING STANDS
Filed June 9, 1964 2 Sheets-Sheet 1
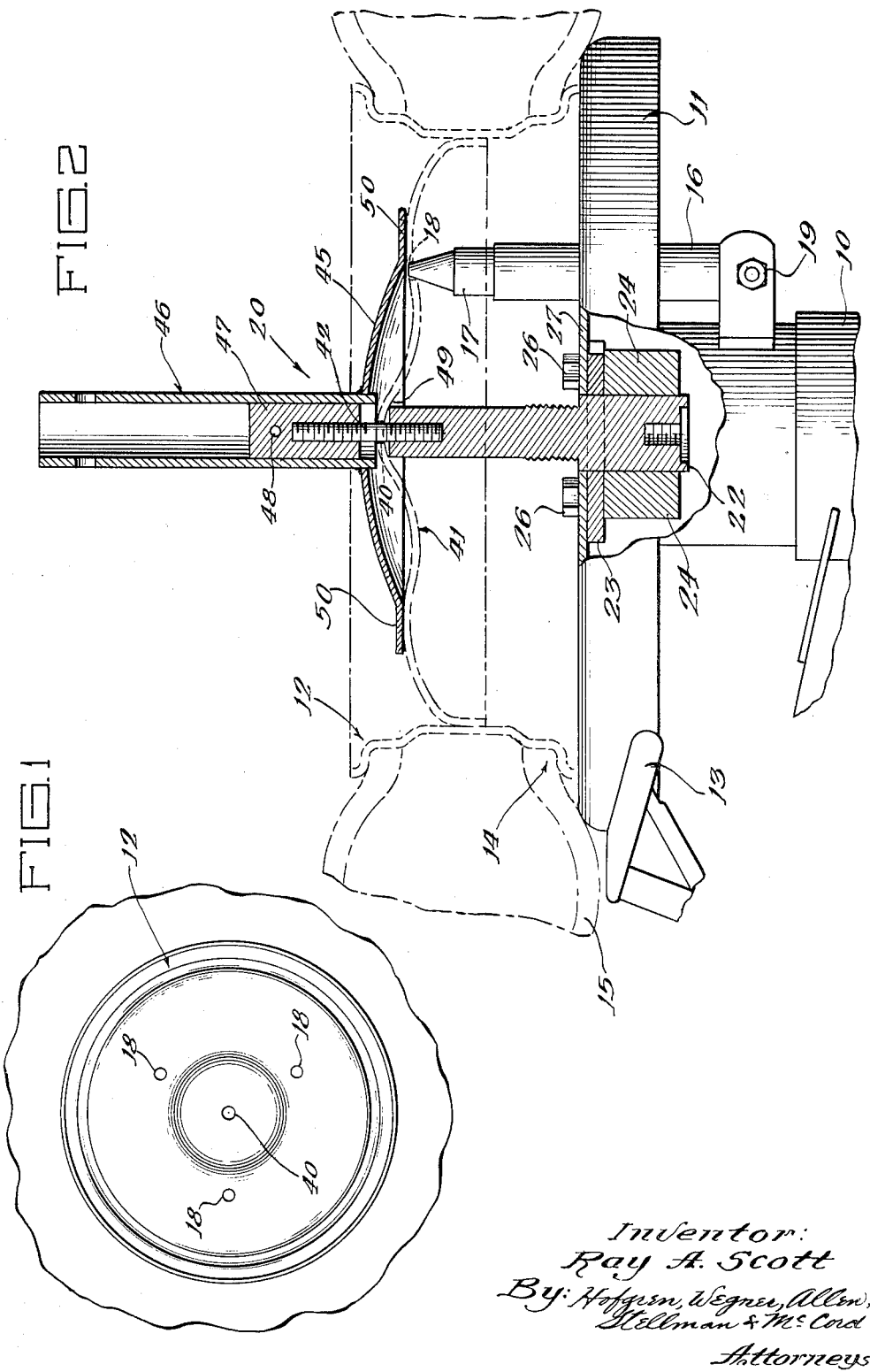
Inventor:
Ray A. Scott
By: Hofgren, Wegner, Allen,
Stellman & McCord
Attorneys

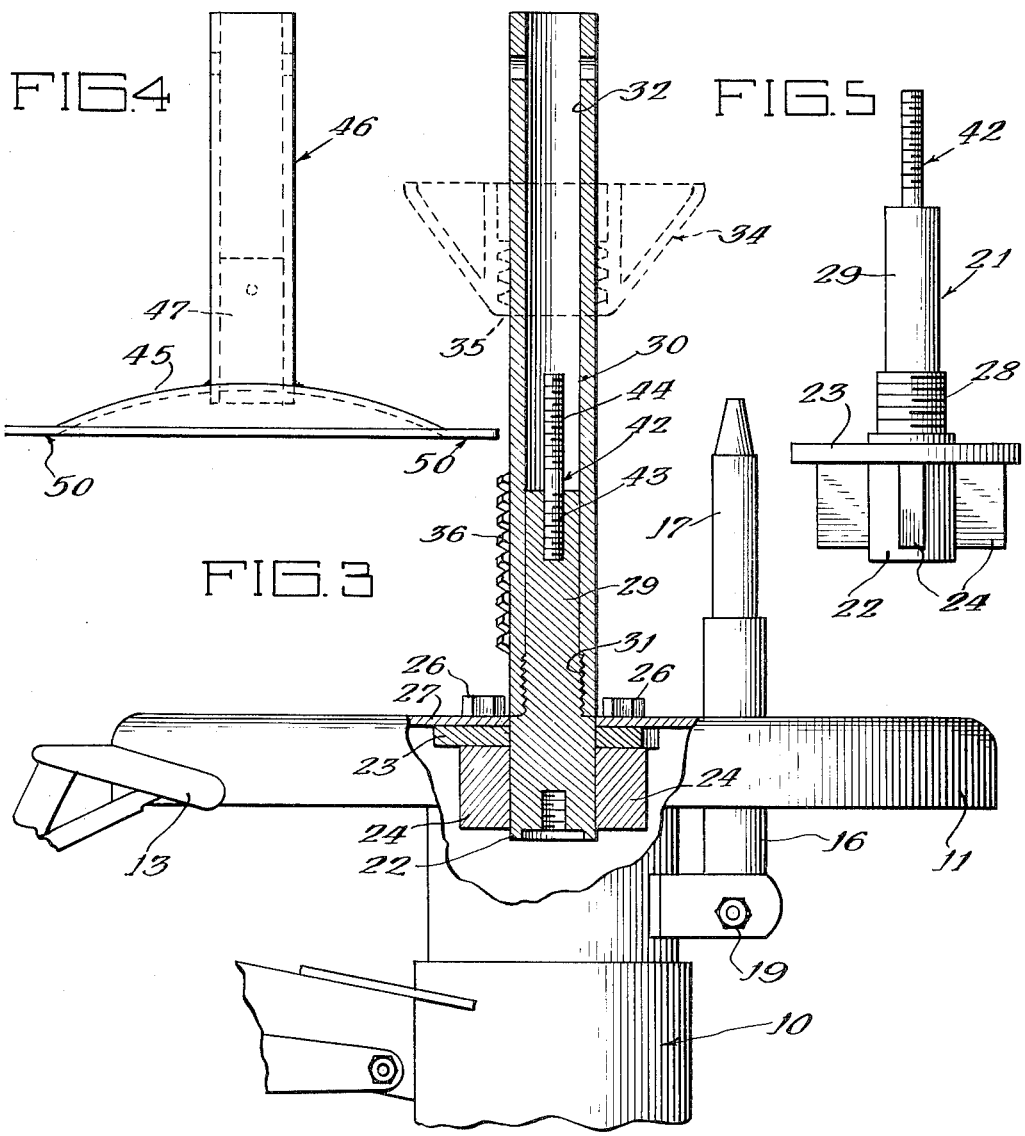
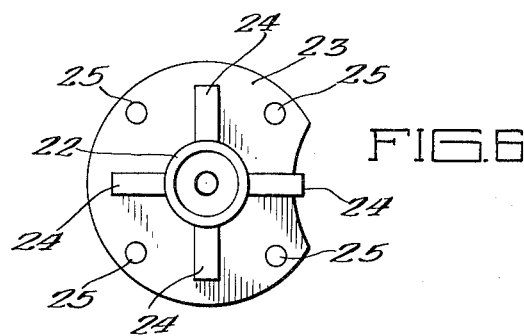

_United States Patent Office_ 3,247,876
Patented Apr. 26, 1966

3,247,876
CENTER POST ASSEMBLY FOR TIRE CHANGING STANDS
Ray A. Scott, Fort Dodge, Iowa, assignor to The Coats Company, Inc., a corporation of Iowa
Filed June 9, 1964, Ser. No. 373,748
4 Claims. (Cl. 157—1.2)

This invention relates to a center post assembly for tire changing stands and more particularly to a novel construction of a post which may use relatively small parts and, because of the design, withstand the relatively large stresses to which such a post is subjected in use.

In the United States most passenger car wheel rims have a center opening of some three or four inches in diameter. Most of the tire changing stands made for use in this country secure the wheel rim upon the stand by clamping the rim against a table or supporting platform. The clamping usually takes the form of a wedging device about a relatively large post, the post extending through the center opening in the wheel rim and the wedge being placed between the center post and the center opening in the wheel rim. Certain foreign-made automobiles utilize wheel rims without such a large center opening. For example, the Renault and Peugeot automobiles utilize a wheel rim without a large center opening and only a small tapped opening through which a threaded stud is placed to hold on the hubcap. Such wheel rims cannot be serviced upon the American tire changing stands for the simple reason that the large center post will not extend through the small center opening.

There is a reason for the American tire changing stands having a relatively rugged and thus large size of center post. The changing of a tire often involves the prying of the tire bead over the wheel rim and this is done with a tire tool fulcrumed as a lever against the center post with the working end between the wheel rim and tire bead, and moved by force around the wheel rim.

The workman in gradually putting the tire on or taking it off may exert considerable prying force against the center post including jerking blows and application of leverage to the tire tool. The post must withstand the forces thus applied to it.

The principal object of this invention is to provide a new and improved center post assembly for tire changing stands.

Another object is to provide adequate strength of parts for a center post assembly through unique structure so that relatively small parts are capable of withstanding the forces applied to the assembly in tire changing operations.

Another object is to utilize relatively small parts in the center post assembly which are necessary with some wheel rims with such parts so related and cooperating with other parts that they are of sufficient strength.

Another object is to provide a center post assembly of new construction readily useable with both American-made and foreign-made automobile wheel rims.

Other objects, features and advantages of the present invention will be apparent from the following description of a preferred embodiment illustrated in the accompanying drawings, in which:

FIGURE 1 is a fragmentary plan view of a Renault automobile wheel rim with the tire portion thereof broken away and illustrating the lug holes and center hole in the wheel disc;

FIGURE 2 is a fragmentary side elevational view partially in section through the upper part of a tire changing stand, particularly showing the center post assembly of this invention thereon and a wheel rim substantially similar to that shown in FIGURE 1 in position on the stand;

FIGURE 3 is a view similar to FIGURE 2 showing the center post assembly of this invention in condition to receive an American-made automobile wheel rim;

FIGURE 4 is a side elevational view of the hold-down member illustrated in section in FIGURE 2;

FIGURE 5 is a side elevational view of the center column member of the assembly; and FIGURE 6 is a bottom plan view of the center column illustrated in FIGURE 5.

Referring to FIGURE 2, a typical tire changing stand is illustrated in which a center post 10 supports a table 11 secured to the post in an immovable position for the purpose of holding a wheel rim, such as 12, in a table height position for tire changing operations. The tire changing stand may be equipped with a bead breaking shoe 13 operated by hand leverage or power operation for the purpose of loosening the bead portion 14 of a tire 15 from the wheel rim. Generally, the wheel rim is clamped against the supporting platform or table 11 and held against rotation by an anti-rotation device 16 incorporating a spring-urged plunger 17 intended to engage within one of the lug openings, such as 18, in a wheel rim. The assembly is pivoted on the bolt 19 so as to be movable at its outer end toward and away from the center of the platform in order to be placed within a lug opening of different sized wheel rims. The present invention is concerned with the center post assembly itself, its construction and form.

The parts of the novel center post assembly are best seen in FIGURES 2 to 6. The basic part is a central column 21 which is a solid metal post member with the base 22 welded or otherwise secured to a base plate 23 and braced relative to the plate by a plurality of gussets 24. The base plate 23 is provided with four bolt openings 25 spaced at the corners of a rectangular pattern for the reception of bolts 26 (FIGURES 2 and 3) which serve to secure the center post assembly immovably within the platform 11, the bolts 26 passing through the base plate 23 and the metal wall 27 of the platform 11.

The center column will extend upwardly from the platform when secured as described. Immediately above the platform 11 the column is provided with a male external thread 28 and a smooth cylindrical bearing surface 29 immediately above the threaded section. As illustrated in FIGURE 3, a hollow center post 30 may telescope over the center column and being equipped with a female thread 31 at its lower end may be threadably joined to the center column. The post has a smooth interior cylindrical surface 32 which will closely fit about the cylindrical surface 29 on the column, thus giving the center post a bearing support against the column. Once the post is threaded into position, it will be solid with the center column and constitute a rigid extension thereof. The walls of the post are sufficiently thick to withstand considerable battering and force applied against them as by the fulcruming of a tire tool against the post. As further illustrated in FIGURE 3, a conical hold-down member 34 is provided with a coarse internal thread 35 to cooperate with an external thread plate 36 on the hollow post in order to hold an American-made wheel rim against the platform 11. The outer conical surface of the member 34 will engage the relatively large opening in the wheel rim to secure the American-made wheel in place.

In order to accommodate a foreign-made wheel rim to the tire changing stand, a rim such as illustrated in FIGURE 1 which has only a small center opening 40 in the metal disc 41 (FIGURE 2), the center column 21 is provided with an outwardly extending threaded stud 42. This stud has an external thread and is mounted coaxially with the center column. As illustrated in FIG- URES 2 and 3, the center column portion may be provided with a tapped opening into which a threaded lower portion 43 of the stud may be threadably received, thus exposing the threaded outer portion 44. The stud is of high tensile steel specifically selected for its ability to withstand considerable tensile stress. In the design of the present center post assembly a means is provided whereby little shear stress will be applied to the stud and most of the stress will be in tension.

The placement of a foreign-made wheel rim upon the tire changing stand is illustrated in FIGURE 2. Here the stud 42 may freely extend through the small opening 40 in the center of the wheel. The hold-down member attaches to the exposed end of the stud in such a way that the tension forces mentioned are applied to the stud. The hold-down member includes an arm means, preferably in the form of a stiff metal disc 45, welded or otherwise secured to an upstanding shaft 46 within which a nut member 47 having a threaded central bore to receive the stud 42 is pinned or otherwise secured. A pin 48 may insure that the shaft 46 and nut member 47 turn together.

In operation the hold-down member is caused to be rotated and thus advanced along the threaded stud 42 toward the wheel rim. The rim rests upon the upper end of the intermediate column portion substantially at the area indicated 49 in FIGURE 2. As the hold-down member is advanced along the stud, a relatively flat circular area 50 of the metal disc engages the wheel rim at a considerable distance laterally of the center column. The further the hold-down member is advanced toward the platform, the greater tensile stress is applied to the stud 42 and the tighter the outer flat area 50 of the disc engages the wheel rim. A very tight arrangement between the hold-down and the wheel rim may thus be accomplished. When lateral stresses are applied against the shaft 46, a force couple is set up whereby the disc presses down on the wheel rim at the flat area 50 and added tension is placed in the stud 42. Due to the friction between the disc and wheel rim, there is little tendency for shear stresses to be set up in the stud 42.

It is a simple matter from the construction described to remove the hollow center post 30, thus exposing the stud 42 for use with foreign automobile wheel rims. Whether used with the hollow post 30 or as illustrated in FIGURE 2, the center post assembly is sufficiently strong to withstand all forces applied to it.

The foregoing detailed description has been given for clearness of understanding only and no unnecessary limitations should be understood therefrom as some modifications will be obvious to those skilled in the art.

I claim:

1. A center post assembly for tire changing stands adapted to hold wheel rims having a relatively small center opening on the stand for tire changing operations, comprising:

an upright column firmly mounted on the stand in a position to repose centrally of a wheel rim placed in tire changing position on the stand, a threaded stud of relatively small diameter carried by and extending outwardly of the column, said stud being of metal with substantial tensile strength and being freely receivable through a relatively small central opening in a wheel rim, and a hold-down member having an upstanding post portion and an outwardly extending arm portion, at the lower end of the post portion said post portion containing a central threaded bore matingly receiving said stud with the arm portion engaging and clamping the wheel rim against the stand outwardly of the column, said post portion having a free end extending upwardly from the arm portion to afford a tire tool engaging surface whereby a tire tool forced laterally against said post for movement circumferentially of the wheel rim stresses said stud primarily in tension.

2. A center post assembly for tire changing stands, comprising:

an upright column having means securing the column to a wheel rim supporting platform in position to extend centrally of a wheel rim placed on the platform, said column having a male threaded section adjacent its base to secure a hollow post telescoped over the column above said threads and having mating threads to engage those on said column, an upright threaded stud centrally and coaxially of the column, supported by said column and exposed upon removal of the hollow post, said stud being of small size to extend freely through a relatively small center hole in a wheel rim, a hold-down member cooperative with said stud and upright column and having a central shaft portion and an outwardly extending arm portion, the central portion having an outer sleeve and an inner threaded member for receiving the stud by threaded engagement, the arm portion engaging the wheel rim outwardly of the central column upon threaded advance of the hold-down member toward the platform and being threadably tightened to stress the stud in tension, said outer sleeve having a free end portion extending above the arm portion providing an outer surface against which a tire tool may be pried for tire removal and replacement relative to the rim with side thrust on said sleeve providing a force couple forcing the hold-down arm portion downwardly against the wheel rim and tension lengthwise of the threaded stud without substantial shear stress whereby relatively small size parts may withstand the forces applied in removing and replacing a tire on a wheel rim.

3. A center post assembly as specified in claim 2 wherein said outwardly extending arm portion includes an outermost peripheral portion having a ring-like tire engaging surface.

4. A center post assembly for tire changing stands, comprising:

an upstanding column having means for firmly securing the same to the stand, means on the column for locking the wheel rim about the column including a portion of the column constructed and arranged to extend through a relatively small central opening in a wheel rim, hold-down means including outwardly extending arm means and a central shaft secured to the arm means and having an upwardly extending free end portion affording a tire tool engaging surface, said central shaft further having means selectively engageable with said column portion, said means selectively movable towards said wheel rim while engaged with said column portion to clamp said arm means against the wheel rim in an area laterally removed from the wheel rim central opening.

References Cited by the Examiner

UNITED STATES PATENTS

| | | |
|---|---|---|
| 1,975,148 | 10/1934 | Hassett. |
| 2,178,101 | 10/1939 | Hatch. |
| 2,464,638 | 3/1949 | Falkner _____ 157—1.2 |
| 2,481,926 | 9/1949 | Henderson. |
| 2,513,756 | 7/1950 | Smyser _____ 157—1.2 |
| 2,518,126 | 8/1950 | Daw et al. _____ 157—1.2 |
| 2,916,065 | 12/1959 | Duquesne. |

FOREIGN PATENTS 378,277    8/1932    Great Britain.

GRANVILLE Y. CUSTER, JR., *Primary Examiner.*